(12) United States Patent
Gong et al.

(10) Patent No.: US 9,713,208 B2
(45) Date of Patent: *Jul. 18, 2017

(54) LED LIGHTING DEVICE

(71) Applicant: LUMENS CO., LTD., Yongin-si, Gyeonggi-do (KR)

(72) Inventors: Myeong Kook Gong, Yongin-si (KR); Hee Jin Jung, Seongnam-si (KR)

(73) Assignee: LUMENS CO., LTD., Yoingin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,028

(22) Filed: Jun. 25, 2016

(65) Prior Publication Data

US 2016/0309556 A1 Oct. 20, 2016

Related U.S. Application Data

(63) Continuation of application No. 14/405,246, filed as application No. PCT/KR2013/004866 on Jun. 3, 2013, now Pat. No. 9,408,263.

(30) Foreign Application Priority Data

Jun. 4, 2012 (KR) ........................ 10-2012-0059977

(51) Int. Cl.
*H05B 37/02* (2006.01)
*H05B 33/08* (2006.01)

(52) U.S. Cl.
CPC ..... *H05B 33/0815* (2013.01); *H05B 33/0845* (2013.01); *H05B 33/0884* (2013.01); *Y02B 20/348* (2013.01)

(58) Field of Classification Search
CPC ..... H05B 37/02; H05B 41/36; H05B 41/3924
(Continued)

(56) References Cited

U.S. PATENT DOCUMENTS

2012/0262084 A1 10/2012 Liu
2013/0181624 A1* 7/2013 Kang ................. H05B 33/0851
315/200 R
(Continued)

FOREIGN PATENT DOCUMENTS

CN 102014546 A 4/2011
JP 2004-296205 10/2004
WO WO 2011/148590 A1 12/2011

OTHER PUBLICATIONS

Japanese Office Action mailed Sep. 1, 2015 in Japanese Patent Application No. 2015-514927, 1 pg.
(Continued)

*Primary Examiner* — Don Le
(74) *Attorney, Agent, or Firm* — Ichthus International Law, PLLC

(57) ABSTRACT

Provided is a circuit for preventing an operating current of a TRIAC dimmer from being dropped below a holding current value. In this regard, a light emitting diode (LED) lighting device includes a TRIAC dimmer for controlling intensity of light emitted from an LED, a load connected between an output terminal of the TRIAC dimmer and a bridge rectifier to stabilize operation of the TRIAC dimmer even in low dimming level periods of the TRIAC dimmer, the bridge rectifier connected with the load to supply an operating current to the LED; and the LED for receiving the operating current from the bridge rectifier.

13 Claims, 3 Drawing Sheets

(58) Field of Classification Search
USPC .......................................................... 315/291
See application file for complete search history.

(56) References Cited

U.S. PATENT DOCUMENTS

2014/0265898 A1* 9/2014 Del Carmen, Jr. H05B 33/0815
315/200 R
2016/0234902 A1* 8/2016 Liu .................... H05B 33/0815

OTHER PUBLICATIONS

Chinese Office Action mailed Jun. 30, 2015 in Chinese Patent Application No. 201380025925.5, 3 pgs.

* cited by examiner

LED LIGHTING DEVICE

CROSS-REFERENCE TO RELATED APPLICATION(S)

This application is a Continuation of U.S. application Ser. No. 14/405,246, filed on Dec. 3, 2014, which is the National Entry of the International Application No. PCT/KR2013/004866, filed Jun. 3, 2013, claiming priority to Korean Patent Application Nos. 10-2012-0059977, filed on Jun. 4, 2012, the entire contents of which are incorporated herein by reference in their entirety.

TECHNICAL FIELD

The present invention relates to a light emitting diode (LED) lighting device and, more particularly, to a circuit configuration capable of preventing flickering due to the characteristics of a triode for alternating current (TRIAC) dimmer.

BACKGROUND ART

Solid-state lighting (SSL) devices such as light emitting diode (LED) lighting devices attract much attention due to features such as low power consumption, long life and high luminance.

One of the significant elements of a lighting device is a dimmer for controlling the brightness of light, and recently TRIAC-based dimmers are frequently used (See Korean Patent No. 1055865).

In the above-described TRIAC-based dimmers, however, it is problematic that the load of the LED lighting device is too small to appropriately operate with the TRIAC dimmer. As such, the LED lighting device may flicker at a very low diming level or may even get permanently switched off. That is, when TRIAC dimmers are present, low power consumption of SSL devices may cause problems due to a latching and holding currents of the TRIAC dimmers.

In particular, lamps having low power consumption below 40 W (e.g., 2 W candle light bulb for E14 screw socket) do not reach the minimum load of a TRIAC dimmer. Accordingly, an operating current of the TRIAC dimmer drops below a holding current value and thus the LED lighting device may flicker and even may stop working.

That is, the minimum dimming level (MIN) includes a range in which a current flowing through a TRIAC dimmer drops below a holding current, and LED lighting device flickers in these periods.

DETAILED DESCRIPTION OF THE INVENTION

Technical Problem

The present invention provides an electric circuit capable of preventing an operating current of a TRIAC dimmer from dropping below a holding current value.

The present invention also provides an electric circuit capable of stabilizing an output voltage of a TRIAC dimmer.

Other technical problems to be solved by the present invention will be understood by the following description of embodiments.

Technical Solution

According to an aspect of the present invention, there is provided a light emitting diode (LED) lighting device including an LED; a bridge rectifier; a TRIAC dimmer for controlling the luminance of the LED; and a load connected between an output terminal of the TRIAC dimmer and the bridge rectifier to stabilize the operation of the TRIAC dimmer even in low dimming level of the TRIAC dimmer, wherein the bridge rectifier is connected with the load to supply an operating current to the LED and the LED receives the operating current from the bridge rectifier.

The load may include a load resistor that is connected between a first node of the output terminal and a second node of the output terminal, and connected in parallel with the bridge rectifier.

The load may include a first damping resistor that is connected between a first node of the output terminal and a first node of the bridge rectifier, and a second damping resistor that is connected between a second node of the output terminal and a second node of the bridge rectifier.

The load may include a first damping resistor that is connected between a first node of the load resistor and a first node of the bridge rectifier, and a second damping resistor that is connected between a second node of the load resistor and a second node of the bridge rectifier.

Each of the first and second damping resistors may include a plurality of resistors connected in parallel with each other.

Advantageous Effects

According to the present invention, by adding a simple circuit configuration, an operating current of a TRIAC dimmer may be prevented from dropping below a holding current value in the minimum dimming level of the dimmer, and thus flickering of a light emitting diode (LED) may be prevented.

Furthermore, by adding damping resistors, an output voltage of the TRIAC dimmer may be stabilized and thus operation of the LED may also be stabilized.

BEST MODE

The present invention now will be described more fully hereinafter with reference to the accompanying drawings, in which embodiments of the invention are shown. The present invention may, however, be embodied in many alternate forms and should not be construed as limited to the embodiments set forth herein. Accordingly, it should be understood that the invention is to cover all modifications, equivalents, and alternatives falling within the spirit and scope of the invention as defined by the claims.

Terms used herein to describe specific embodiments are for descriptive purposes only and are not intended to limit the scope of the present invention. The singular forms "a", "an" and "the" are intended to include the plural forms as well, unless the context clearly indicates otherwise.

Hereinafter, the present invention will be described in detail by explaining embodiments of the invention with reference to the attached drawings.

Figure 1:
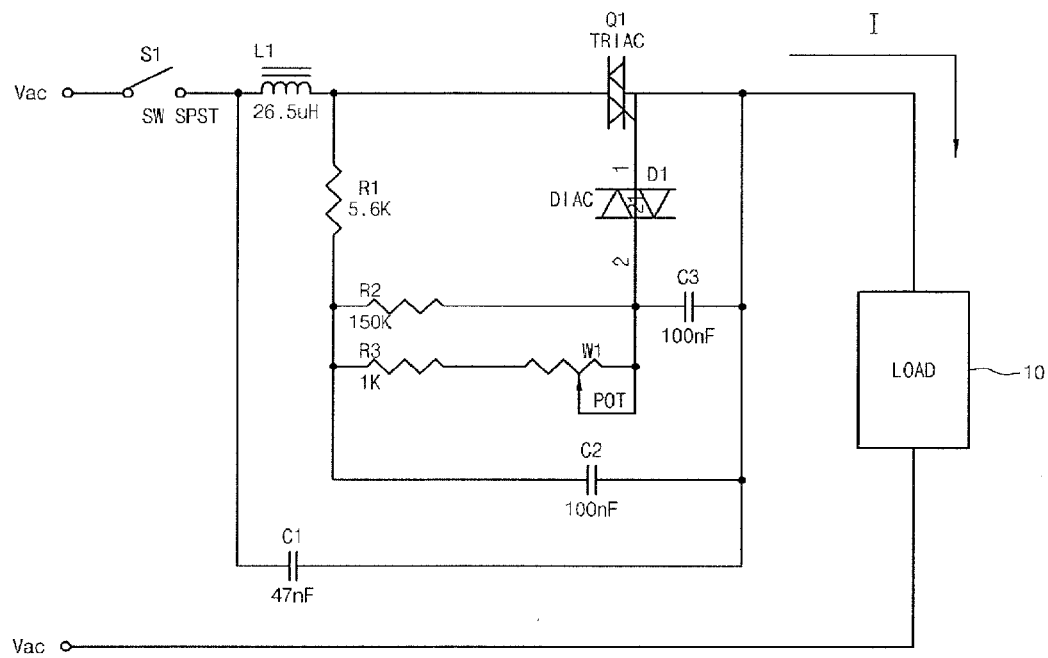
FIG. 1 is a circuit diagram of a TRIAC dimmer.

FIG. 1 is a circuit diagram of a TRIAC dimmer.

The basic elements of the TRIAC dimmer include a potentiometer R1, a fixed resister R2, a capacitor C1, a variable resistor W1, a diode for alternating current (DIAC) and a TRIAC.

A resistor-capacitor (RC) network comprising R1, R2 and C1 delays the start-up of the TRIAC until the voltage of C1 reaches a trigger voltage of the DIAC. When the resistance of the variable resistor W1 increases, the start-up delay that reduces the on-time or "conduction angle" of the TRIAC, increases.

The phase of the dimmer is controlled by W1 and C3, and the size of the conduction angle is controlled by a change of resistance of the variable resistor W1.

That is, when a current flowing through R2, R3 and W1 charges C3 and a voltage charged by the current reaches the break over voltage of the DIAC, a current is applied to a gate of the TRIAC, thereby turning on the TRIAC. Accordingly, the conduction angle of the TRIAC is controlled by the current charged in C3.

The basic operation of the TRIAC dimmer will now be described with reference to FIG. 1.

When a current is applied to the gate of the TRIAC, the TRIAC is immediately turned on and thus an operating current I of the dimmer flows. Here, the operating current I should not be dropped below a minimum holding current Ih to maintain the ON state of the TRIAC.

Accordingly, if the operating current I of the TRIAC dimmer drops below the holding current Ih, the TRIAC turns off. A current should be applied to the gate to return the TRIAC to the ON state.

As such, the operating current I of the dimmer should always be maintained not less than the holding current Ih to maintain the operation of the TRIAC dimmer.

Here, the operating current I of the dimmer may be controlled by the load 10 that is applied to an output terminal of the dimmer.

Figure 2:
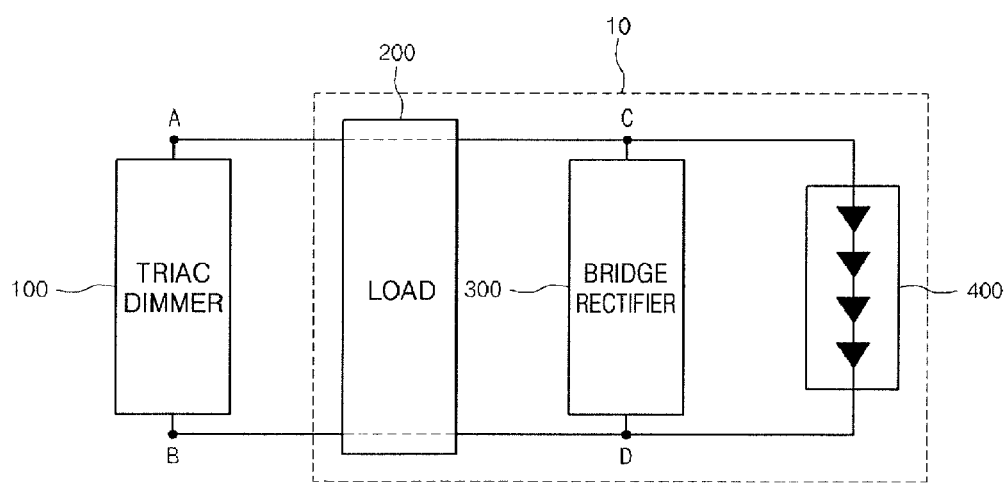
FIG. 2 is a block diagram of a light emitting diode (LED) lighting device according to an embodiment of the present invention.

FIG. 2 is a block diagram of a light emitting diode (LED) lighting device according to an embodiment of the present invention.

The LED lighting device comprising a TRIAC dimmer according an embodiment of to the present invention includes a TRIAC dimmer 100, a load 200, a bridge rectifier 300 and an LED 400.

The TRIAC dimmer 100 controls the brightness of or dims light. The brightness of light may be controlled by changing the value of the resistance of the variable resistor W1 described above with reference to FIG. 1.

The load 200 is connected between an output terminal of the TRIAC dimmer 100 and the bridge rectifier 300. That is, the load 200 is connected between node A and node C, and between node B and node D.

The circuit configuration of the load 200 will be described later with reference to FIG. 3.

The load 200 may stabilize the operation of the TRIAC dimmer 100 even in a low dimming level of the TRIAC dimmer 100. The reason why the load 200 can stabilize the operation of the TRIAC dimmer 100 even in a low dimming level of the TRIAC dimmer 100 will be described later with reference to FIG. 4.

The bridge rectifier 300 supplies a current to the LED 400. The bridge rectifier 300 receives an operating current from the TRIAC dimmer 100, rectifies the operating current, and supplies the rectified current to the LED 400.

The LED 400 receives the current and emits light, and includes one or more LEDs.

Figure 3:
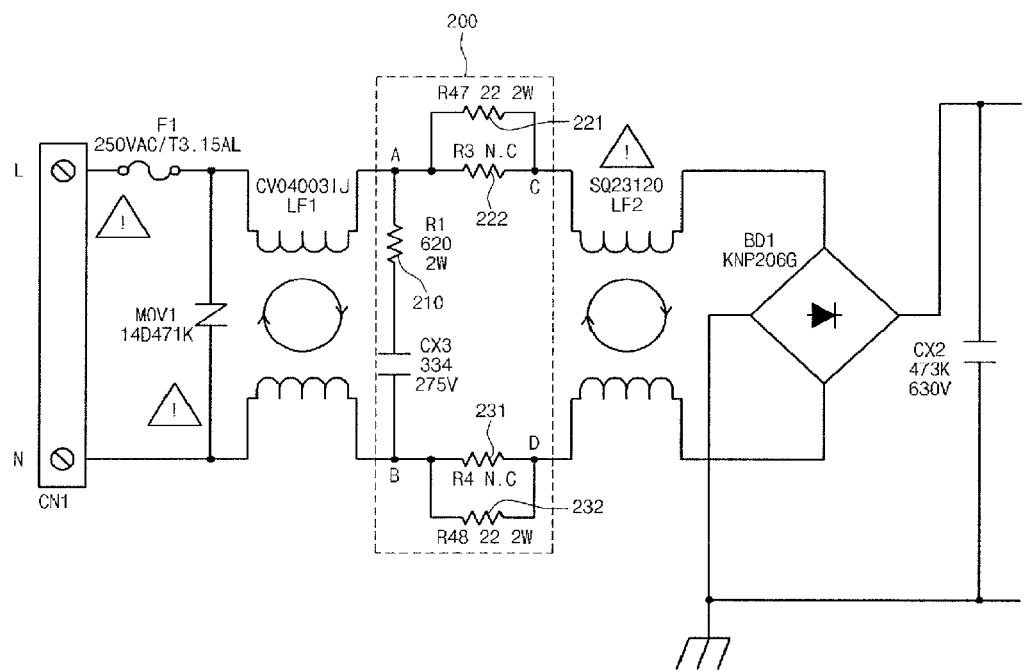
FIG. 3 is a circuit diagram of a load according to an embodiment of the present invention.

FIG. 3 is a circuit diagram of the load according to an embodiment of the present invention.

As described above with reference to FIG. 2, the load 200 is connected between an output terminal (nodes A and B) of the TRIAC dimmer 100 and an input terminal (nodes C and D) of the bridge rectifier 300.

That is, the load 200 is connected in parallel with the bridge rectifier 300 and is connected with the output terminal (nodes A and B) of the TRIAC dimmer 100.

The internal circuit configuration of the load 200 will be described hereinafter.

The load 200 includes a load resistor 210 that is connected between a first node (node A) of the output terminal of the TRIAC dimmer 100 and a second node (node B) of the output terminal of the TRIAC dimmer 100, and is connected in parallel with the bridge rectifier 300.

Here, the bridge rectifier 300 and the LED 400 may be considered as loads having resistance. Accordingly, since the load resistor 210 is connected in parallel with the bridge rectifier 300 and the LED 400, the resistance of the output terminal of the TRIAC dimmer 100 becomes low.

In addition, the load 200 may further include first damping resistors 221 and 222 and second damping resistors 231 and 232. The first damping resistors 221 and 222 are connected between the first node (node A) of the output terminal of the TRIAC dimmer 100 and a first node (node C) of the bridge rectifier 300, and the second damping resistors 231 and 232 are connected between the second node (node B) of the output terminal of the TRIAC dimmer 100 and a second node (node D) of the bridge rectifier 300.

The first damping resistors 221 and 222 and second damping resistors 231 and 232 are configured to eliminate noise caused by overshoot or undershoot included in the waveform of a voltage output from the output terminal of the TRIAC dimmer 100.

Here, each of the first damping resistors 221 and 222 and second damping resistors 231 and 232 may include a plurality of resistors connected in parallel with each other.

MODE OF THE INVENTION

Figure 4:
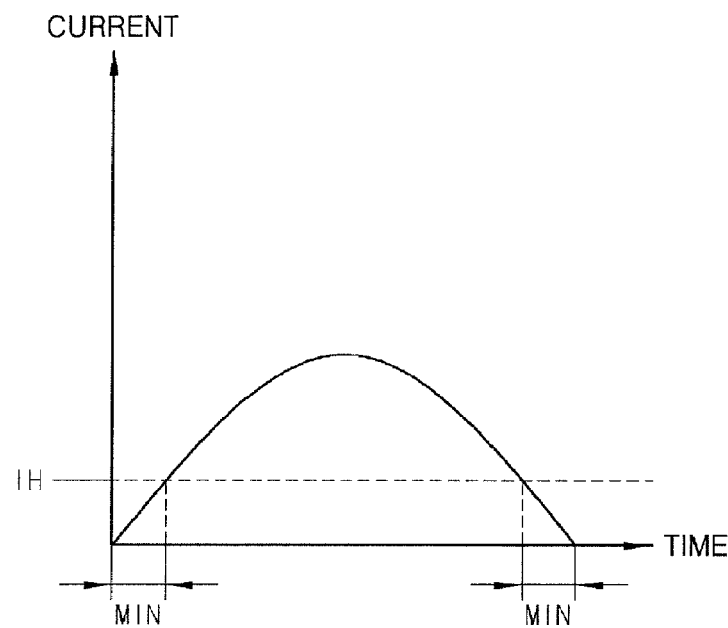
FIGS. 4 and 5 are graphs showing an operating current of a TRIAC dimmer in a dimming period, according to an embodiment of the present invention.
Figure 5:
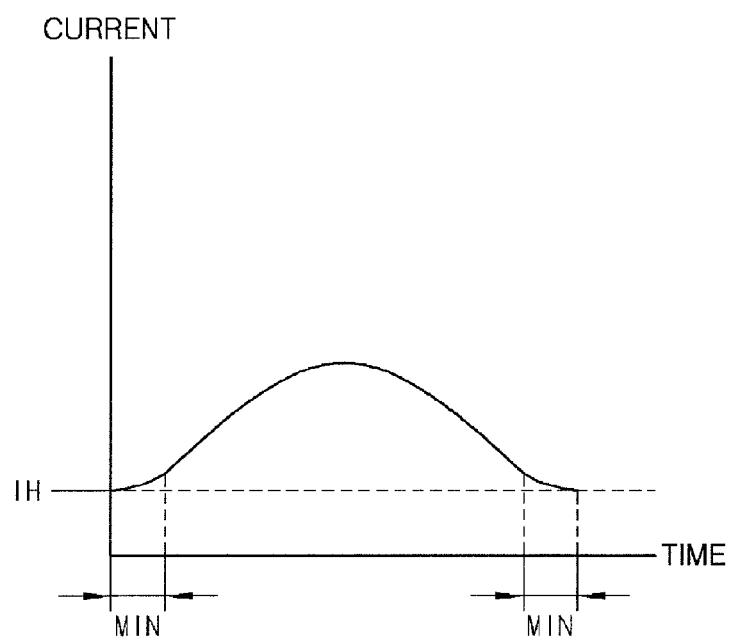

FIGS. 4 and 5 are graphs showing an operating current of a TRIAC dimmer in a dimming period, according to an embodiment of the present invention.

FIG. 4 is a graph showing the operating current of the TRIAC dimmer in the dimming period when the load 200 is not configured.

A curved line indicates the operating current of the TRIAC dimmer, and a dashed line indicates a holding current of the TRIAC dimmer.

As shown in FIG. 4, when the load 200 is not provided, the operating current of the TRIAC dimmer drops below the holding current of the TRIAC dimmer in the minimum dimming level (MIN) of the dimming period. Accordingly, the TRIAC dimmer turns off in these ranges as described above with reference to FIG. 1.

FIG. 5 is a graph showing the operating current of the TRIAC dimmer in the dimming period when the load 200 is provided.

FIG. 5 shows that, when the load 200 is provided, the operating current of the TRIAC dimmer does not drop below the holding current of the TRIAC dimmer in the minimum dimming level (MIN) of the dimming period. Accordingly, the TRIAC dimmer may maintain the ON state even in these ranges.

INDUSTRIAL APPLICABILITY

According to the present invention, by adding a simple circuit configuration, an operating current of a TRIAC dimmer may be prevented from dropping below a holding current in the minimum dimming level of the dimmer, and thus flickering of a light emitting diode (LED) may be prevented.

The invention claimed is:

1. A light emitting diode (LED) lighting device comprising:
    a light emitting element including one or more LEDs;
    a triode for alternating current (TRIAC) dimmer for controlling a luminance of the light emitting element and having a first node and a second node at an output terminal;
    a bridge rectifier disposed between the TRIAC dimmer and the light emitting element, wherein the bridge rectifier is connected between the first node and the second node of the TRIAC dimmer to configure a third node corresponding to the first node of the TRIAC dimmer and a fourth node corresponding to the second node of the TRIAC dimmer; and
    a load including a load resistor, disposed between the first node of the TRIAC dimmer and a first node of the bridge rectifier,
    wherein the load is connected between the second node of the TRIAC dimmer and a second node of the bridge rectifier,
    wherein the load is configured to maintain an operating current of the TRIAC dimmer so as to have the operating current of the TRIAC dimmer does not drop below a holding current of the TRIAC dimmer at a minimum dimming level of a dimming period, and
    wherein the load resistor includes at least one first damping resistor that is connected between the first node of the TRIAC dimmer and the first node of the bridge rectifier, and at least one second damping resistor that is connected between the second node of the TRIAC dimmer and the second node of the bridge rectifier.

2. The LED lighting device of claim 1, wherein the load resistor is connected between the first node and the second node of the TRIAC dimmer, and is connected in parallel with the bridge rectifier.

3. The LED lighting device of claim 1, wherein the load resistor is configured to eliminate noise caused by an overshoot or an undershoot included in a waveform of a voltage output from the output terminal of the TRIAC dimmer.

4. The LED lighting device of claim 1, wherein the TRIAC dimmer maintains an ON state above a holding current.

5. A light emitting diode (LED) lighting device comprising:
    a LED;
    a bridge rectifier;
    a triode for alternating current (TRIAC) dimmer for controlling a luminance of the LED; and
    a load disposed between an output terminal of the TRIAC dimmer and an input terminal of the bridge rectifier to stabilize an operation of the TRIAC dimmer at a low dimming level of the TRIAC dimmer, wherein the load is coupled to the TRIAC dimmer and configured to supply a current into the TRIAC dimmer so as to keep an operating current of the TRIAC dimmer above a holding current value,
    wherein the load includes a load resistor, which comprises a first resistor that is connected between a first node of the TRIAC dimmer and a first node of the bridge rectifier, and a second resistor that is connected between a second node of the TRIAC dimmer and a second node of the bridge rectifier.

6. The LED lighting device of claim 5, wherein the holing current value comprises a minimum dimming current that maintains the operation of the TRIAC dimmer stable.

7. The LED lighting device of claim 5, wherein the load resistor is disposed in parallel with the TRIAC dimmer.

8. The LED lighting device of claim 5, wherein the load includes a capacitor disposed in parallel with the TRIAC dimmer and connected in series with the load resistor.

9. The LED lighting device of claim 8, wherein the capacitor is configured to charge when the operating current of the TRIAC dimmer is greater than or equal to the holding current value and discharge toward a resistor connected in series when the operating current of the TRIAC dimmer is less than the holding current value so as to maintain the TRIAC dimmer in an ON state.

10. The LED lighting device of claim 5, wherein the first resistor comprises a first plurality of damping resistors and the second resistor comprises a second plurality of damping resistors, and the first resistor and the second resistor are disposed in parallel with the TRIAC dimmer.

11. The LED lighting device of claim 10, wherein the damping resistors comprise a plurality of resistors disposed in parallel with each other.

12. The LED lighting device of claim 10, wherein the first plurality of damping resistors and the second plurality of damping resistors are configured to reduce noise caused by an overshoot or an undershoot in a waveform of a voltage output from the output terminal of the TRIAC dimmer.

13. The LED lighting device of claim 5, wherein the load is further configured to supply the current into a gate of a TRIAC disposed in the TRIAC dimmer so as to keep the operating current of the TRIAC dimmer above the holding current value.

* * * * *